Patented Oct. 10, 1933

1,929,866

UNITED STATES PATENT OFFICE 1,929,866

PRODUCTION OF SULPHURIC ESTERS OF ANTHRAHYDROQUINONE AND ITS DERIVATIVES

David Alexander Whyte Fairweather and John Thomas, Grangemouth, Scotland, assignors to Scottish Dyes, Limited, Grangemouth, Scotland No Drawing. Application January 10, 1930, Serial No. 420,002, and in Great Britain January 23, 1929

7 Claims. (Cl. 260—98)

This invention relates to the production of intermediates for vat dyestuffs, and more particularly to the production of sulphuric esters of anthrahydroquinone and its derivatives.

The object of the invention is to provide improved or modified processes for the manufacture of known esters or processes for the manufacture of new esters, and processes for the application of the products.

The invention in brief consists in a process in the esterification of anthrahydroquinone in which one of the hydroxyl groups is protected by ester formation, for example, by the introduction of an acetyl or benzoyl group, for the formation of mono-sulphuric esters.

The invention also consists in a process according to the preceding paragraph, in which the remaining hydroxyl group is esterified, for instance, to form the sulphuric ester by using pyridine sulphur trioxide in the presence of a tertiary base.

The invention also consists in a form or modification of the process referred to above, in which partial esterification with pyridine sulphur trioxide in the presence of a tertiary base is first carried into effect.

The invention also consists in a form or modification of the processes referred to above, comprising the preparation of disulphuric esters, followed by partial hydrolysis for the preparation of mono-sulphuric esters.

The invention also consists in a form or modification of processes as indicated above, in which attackable amino or hydroxy groups are present, according to which these groups are first suitably protected, for instance, by acetylation.

The invention also consists in processes substantially as herein described.

The invention also consists in products when made by processes as indicated above, or by the obvious chemical equivalents of those processes.

The following examples illustrate how the invention may be carried into effect, references to parts and to percentages being to parts and percentages by weight, and reference to degrees being to degrees centigrade.

Example 1

10 parts anthraquinone, 5 parts zinc dust, and 50 parts pyridine are stirred together in an atmosphere of nitrogen, and 8 parts glacial acetic acid added gradually, the temperature not being allowed to exceed 25°. When reduction is complete 5.1 parts acetic anhydride is added and the mixture heated slowly to 90° in the course of 30 minutes. The temperature is maintained at 90° for 10 minutes, and 10 parts pyridine sulphur trioxide are then added, and the melt is heated at 90° for a further 30 minutes. It is then steam distilled with an aqueous solution of 14 parts sodium carbonate, and filtered. The residue on the filter consists of the sodium salt of anthrahydroquinone-9-sulphuric acid ester-10-acetic ester, together with zinc.

On warming with an aqueous solution of caustic soda, the acetate group is removed, and a solution of the sodium salt of the mono-sulphuric acid ester of anthrahydroquinone obtained, having the structural formula shown below.

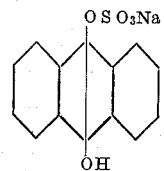

Example 2

6.7 parts of 1 acetylamino anthraquinone, 6 parts zinc dust, and 30 parts pyridine are stirred together in an atmosphere of nitrogen and 5 parts glacial acetic acid added gradually at a temperature not exceeding 25°. When reduction is complete, 4 parts pyridine sulphur trioxide are added, and the melt stirred at 15° for 30 minutes, then at 50° for an hour, and finally at 90° for 15 minutes. The melt is then cooled to 20°, and 5 parts acetic anhydride added. This appears to facilitate the subsequent isolation of the product without substantial decomposition. The temperature is raised to 90° gradually, and stirring continued at that temperature for 30 minutes. The mass is steam distilled with 10 parts sodium carbonate and the sparingly soluble residue filtered off. This is the sodium salt of 1- (or 4) acetyl-amino anthrahydroquinone 9 sulphuric acid ester-10-acetic ester.

On warming gently with caustic soda solution, the acetyl group in the meso position is removed, with formation of the sodium salt of 1- (or 4) acetyl-amino anthrahydroquinone 9 sulphuric acid ester having the structural formula shown below, namely,

Having now described our invention, what we claim as new and desire to secure by Letters Patent is:—

1. A process for the manufacture of 9:10-diesters of anthrahydroquinones, in which one ester is a sulphuric ester, which consists in heating together one molecule of anthrahydroquinone with one molecule of an esterifying agent chosen from the group consisting of pyridine-sulphur-trioxide and acylating agents, and then heating the product with a different esterifying agent also chosen from the aforesaid group.

2. A process as claimed in claim 1, in which one esterifying agent is an acetic esterifying agent.

3. A process as claimed in claim 1, in which one esterifying agent is a benzoic esterifying agent.

4. A process as claimed in claim 1, in which one esterifying agent is an acylating agent.

5. Compounds having the constitution:— where three "X's" represent hydrogen and the remaining "X" represents hydrogen, the radical acylamino or the radical amino.

6. Compounds having the constitution:— where any one "X" represents the radical $NH.COCH_3$ and the other three "X's" represent hydrogen.

7. The compound having the constitution:—

DAVID ALEXANDER
   WHYTE FAIRWEATHER.
J. THOMAS.